Patented July 6, 1948

2,444,413

UNITED STATES PATENT OFFICE 2,444,413

PROCESS OF CONDITIONING REFRACTORY
FOR MAKING MOLDS AND CORES

Bonheur M. Weston, Detroit, Mich.

No Drawing. Application February 2, 1946,
Serial No. 645,238

7 Claims. (Cl. 22—217)

This invention relates to refractories for molds and cores used in casting molten metal. It is the principal object of the invention to provide siliceous refractories such as silicon dioxide and silicon carbide with a renewable bonding coating which will replace the water plasticizable coatings such as clay, cereal bonding materials, and the like, now commonly used. The invention substantially eliminates "burning in" or fusing of the refractory to the metal casting and the formation of detrimental scale and oxides on the surface of the casting which are disadvantages that attend the use of the water plasticized materials for bonding sand in the construction of molds and which appear to be due chiefly to the presence of moisture in the mold at the time of pouring the molten metal against the mold. The heat supplied by the molten metal converts the moisture to steam which develops pressures that interfere with the run and lay of the metal, at times causes formation of cavities in the casting and provides an oxidizing atmosphere at the surface of the casting which favors formation of oxides on, and the fusing of sand to, the casting surface.

In the case of cores where the refractory and its bond is subject to more heat than in the case of molds and where moisture is driven off by baking before casting, the clays and other materials now used as binders form a debris that makes the used refractory unsatisfactory for re-use and difficult to recondition. This disadvantage is avoided by my invention.

I have discovered that fine grained siliceous refractories such as silicon dioxide and silicon carbide may be provided with a relatively long-lived and replenishable coating which will provide the green strength required in molds and cores without the use of water, decompose into a substantially reducing atmosphere at the surface of the mold during the pouring operation without destructive gas or vapor pressures, supply the required bond strength throughout the casting operation and readily break up at the completion of the operation, and leave the residue of coating adhering to the refractory grains in condition for re-use and susceptible to replenishment. By means of my invention, substantially all of the refractory is preserved in condition for re-use for both cores and molds, and used core sands need not be discarded as in the present practice. Furthermore, castings made with molds utilizing my invention have surfaces exceptionally clean and free from scale and fused refractory. These beneficial results flowing from the use of my invention very substantially reduce the cost of castings by eliminating frequent replacement of refractory and the attendant substantial cost of handling. The machining and cleaning operations necessary to free castings of scale and fused refractory which occur in present practice, and scrap castings which are due in the present practice to imperfections brought about by scale, fused refractory and cavities, are also very substantially reduced.

My invention provides each of the refractory particles or grains with a thin coating of plasticizable nonthermosetting resin. By the term "nonthermosetting" it is meant that the resin must not be converted physically when subjected to temperatures below its combustion temperature. In this instance the resin should be combustible at a temperature within the range 600° F. to 800° F. At temperatures above the combustion temperature and in the presence of conditions which support combustion, the resin may be consumed substantially completely. Thus, at the surface of the mold or core the resin may be entirely consumed, but resin farther back in the mold or core which is not subjected to temperatures above the combustion temperature or exposed to conditions which permit combustion should be unchanged or "unconverted" in order to assure an easy "shake-out" and to permit re-use of the coated sand particles. This is done by dissolving or suspending the resin in a combustible nonaqueous solvent which will not chemically react to change the chemical constitution of the resin. A quantity of the resin solution composed of approximately equal parts by weight of resin and solvent, and approximately 2 to 4% by weight of the refractory to be treated, is added to the refractory and thoroughly mixed therewith until each grain of the refractory is coated with a film of the resin solution. When this is accomplished the mass is aerated or dried while being mixed or agitated, at a temperature sufficient to evaporate substantially all of the solvent. This will leave a thin, relatively dry film of the resin firmly adhered to the surfaces of the refractory grains. After drying, the coated refractory grains are not sticky or tacky and will flow with substantially the same freedom as the bare refractory. At the time of use for constructing molds, solvent or plasticizer is applied to the coated refractory for the purpose of plasticizing or softening the surface only of the coating on the refractory sufficiently to develop the cohesiveness between particles that is required to furnish the green bond strength needed for the mold. After addition of the plasticizing solvent, the coated refractory is formed into molds or green cores in the usual manner which are then ready for the casting operation. If it is desired to provide the mold or core with greater strength than the customary green bond strength, and this is usually desirable in the case of cores, the mold or core may be baked after forming to develop such dry bond strength as may be required, and such strength may be increased by including some thermosetting resin or drying compound in the plasticizing solvent. Where the core is baked before using, the baking operation will drive off the plasticizing solvent and thereby strengthen the bond provided by the resin. In the case of molds which ordinarily need not be baked before using, most of the plasticizing solvent will be present in the mold at the time of the pouring operation and the molten metal will cause early ignition of the plasticizing solvent and thus prevent development of detrimental pressures. The heat of the molten metal will also, by eliminating the solvent as stated, cause the strength of the bond furnished by the refractory coating to increase sufficiently to enable the mold to properly contain the casting. Sufficient of the resin coating will be consumed during the casting operation by chemical reaction with the oxygen present to form a reducing atmosphere. The nonthermosetting character of the resin permits shrinkage of the casting and easy break up of the mold.

After the casting operation, the refractory will be found to have retained a very considerable portion of its resin coating and to be substantially free of useless and undesirable debris. The resin which remains upon the refractory is unchanged chemically and retains its plasticizable quality. This refractory may be easily reconditioned by applying more resin coating to it to replace that which has been lost in the casting operation. Experience demonstrates that an amount of resin equal to .2 to .5% of the weight of the sand will be lost in the casting operation and this may be replenished by mixing with the used refractory more resin solution having the proportion of 40 parts of resin to 60 parts of solvent. The replenishing solution should be in the proportion, on the average, of .5 to 1% by weight of the weight of the refractory to be treated, and always sufficient to replace the actual loss.

I have discovered that in order to fix the original resin coating upon the refractory grains prior to use of the coated refractory for a mold, it is necessary that the solvent be driven from the resin of the initial coating, otherwise there will not be sufficient adherence between the resin and the refractory particles. The drying operation has the effect of firmly fixing the resin film on the refractory particles. Then at the time of preparing the mold, solvent or plasticizer is added to plasticize only the outer surface of the fixed resin coating and leave undisturbed the adhesive bond between the surface of the refractory particle and the resin coating. The plasticizing of the outer surface of the resin coating upon the refractory particles develops cohesiveness between the surfaces of the coatings on adjacent particles without disturbing the adhesion of the respective coatings to their respective refractory particles. As the casting operation does not result in the destruction or consumption of all of the resin coating upon the refractory particles, but leaves a substantial residue thereon, it is not ordinarily necessary in replenishing the coating of refractory that is to be promptly reused to again dry the coated refractory after the replenishing solution has been applied because the replenishing coating will readily cohere without drying to the resin coating which remains upon the refractory, and will become fixed on uncoated grains by the heat developed in subsequent casting operations.

However in case the used refractory contains more than about 20% uncoated grains, either because of consumption of resin in the casting operation or addition of uncoated refractory, it will usually be found desirable to dry after replenishment and before use in order to provide a sufficiently high percentage of grains containing a fixed resin coating to obtain the necessary bond strength.

The bond strength of the mold or core may be increased by adding to the standard or usual grain size refractory some finely comminuted refractory such as silica flour. This has the effect of increasing the total surface area of refractory in a given volume that is capable of supporting the bond coating of resin. The amount of fine material to be added can be gauged, as in present practice where clay and cereal binders are used, by standard tests for gas permeability applied to sample or test molds. Care should be taken to avoid use of fine refractories which contain any substantial amount of alkaline substances or which are of highly absorbent nature if the refractory is to be used for cores.

The resins used for providing the coatings described should be combustible in the range 600° F. to 800° F. approximately. They should be nonthermosetting and soluble or dispersible in nonaqueous inflammable solvents which may be driven off or evaporated readily at temperatures below 300° F., have an ignition point preferably above 100° F., and which do not chemically react with the resin or change its nonthermosetting character. It is preferable to use resins which have a relatively high carbon and low hydrogen content in order to take up the oxygen present and minimize the formation of water upon decomposition during combustion. It is also desirable but not essential to catalyze the resin with metallic oxides (not less than ½ of 1% of weight of resin) as such oxides appear to have the effect of inducing an earlier combustion of the carbon of the resin and producing nonoxidizing atmosphere at the surface of the casting. Oxides of silver, nickel, cerium, vanadium, manganese, chromium, copper, cobalt, and iron are suitable.

Aromatic hydrocarbon solvents for the resin are preferable and those having substantially the following properties will be suitable:

| | |
|---|---|
| Gravity A. P. I. | 20.0° to 40.0° Bé. |
| Specific gravity | 0.825 to 0.934 |
| Weight per gallon | 6.87 lb. to 7.78 lb. |
| Kauri butanol value at 77° F. | 60 to 80 cc. |
| Analine point (mixed) | 20° C. to 40° C. |
| Flash point (T. C. C.) | 100° F. to 200° F. |
| I. B. P. | 300° F. to 500° F. |
| E. B. P. | 375° F. to 600° F. |

The following specific solvents may be used:

| | |
|---|---|
| Turpentine | Toluol |
| Benzine | Xylol |
| Methyl methacrylate monomer | Phenol |
| | Ethylene dichloride |
| Coal tar naphtha | Carbon disulphide |
| Benzol | |

The fixing of the initial film on the refractory may also be expedited and its adherence to the refractory surface increased by the inclusion of a small amount of the drying oil to the primary resin solution. Drying oils, such as tung oil, linseed, Perilla, and soy bean oil may be used. In general, a resin solution having approximately 40 parts of resin to 60 parts of solvent by weight will serve. The following general formula will be found to be suitable:

| | |
|---|---|
| Resin_____by weight__ | 40.0 |
| Solvent_____do____ | 57.0 |
| Drying compound____by weight—optional__ | 2.9 |
| Plasticizer, such as: | |
| Polybutene, polyvinyl chloride or dibutyl phthalate_____by weight—optional__ | 0.1 |

The quantity of resin solution to be used should be from approximately 2 to approximately 4% of the weight of the refractory to be treated. Refractories of finer grain size, which will have a greater total surface area in a given volume, will require greater proportions of the resin solution for a satisfactory coating than refractories of larger grain size and less total surface area per unit of volume.

After the initial resin coating has been dried upon the refractory the coated refractory is prepared for the mold by mixing again with solvent or plasticizer for the purpose of plasticizing the surfaces only of the resin coatings on the refractory grains so that they will cohere sufficiently to develop the green bond required in the mold. The amount of plasticizer or solvent for this use should be approximately .75 to 1.5% of the weight of the refractory to be treated and the plasticizing action will be improved if the plasticizing solution contains approximately 10% by weight of the coating resin.

The replenishing resin solution for treating the refractory after use in the casting operation and reconditioning it for further use should be in the proportion of approximately 2 parts of a resin of the type hereinabove described to 3 parts of solvent by weight, which is a formula that enables the automatic replacement of the average loss of resin by calculating and replacing the actual loss of solvent, and approximately on the average of ½ of 1% by weight of the refractory to be reconditioned, care being taken to add sufficient to replace the actual loss.

Hydrocarbon resin produced in petroleum cracking is typical of the resins suitable for use in the instant process. A general specification of a typical resin is as follows:

*Chemical constituents*

| | Per cent |
|---|---|
| Carbon | 84.42 |
| Hydrogen | 8.53 |
| Oxygen | 1.86 |
| Nitrogen | 1.12 |
| Sulphur | 3.50 |
| Moisture | [1] 4. |
| Mineral matter (substantially metallic oxide) | .57 |

[1] Or less.

*Hydrocarbon composition*

| | Per cent |
|---|---|
| Carbenes | .54 |
| Asphaltenes | 68.20 |
| Asphaltic resins | 5.60 |
| Petroleums | 29.74 |
| Solid paraffins | .64 |
| Saturated hydrocarbons | 21.24 |
| Sulforation residue | 93.62 |
| Saponifiable matter | .31 |

*Physical properties*

| | |
|---|---|
| Color in the mass | black |
| Fracture | conchoidal |
| Streak on porcelain | brown |
| Acid number | 1 |
| Molecular weight | 3200 |
| Specific gravity at 77° F | 1.117 |
| Viscosity (NTP) | solid |
| Penetration: | |
| 77°/100/5 | 0 |
| 115°/100/5 | 1 |
| 135°/100/5 | 3 |
| 150°/100/5 | 8.5 |
| 185°/100/5 | 16.0 |
| Ductility at 185° | 2 |
| Susceptibility factor | 42.6 |
| Flash point | 635° F. |
| Fusion point (R & B) | 300 to 350° F. |

It is to be understood that the appended claims are intended to include variations in the specific directions given occurring to those skilled in the art which do not forego the essentials of my invention.

What is claimed is:

1. The process of conditioning siliceous particles selected from the group consisting of silicon dioxide and silicon carbide for use in making molds and cores for casting molten metal which comprises: mixing the siliceous particles with a surface wetting hydrocarbon liquid solution of plasticizable resin until said particles are thoroughly wetted by said solution, evaporating the solvent from said mixture to fix coatings of the resin on said siliceous particles while continuing the mixing agitation and preventing cohesion of particles until each particle acquires a relatively solid adherent film of said resin that is substantially noncohering under normal temperatures and pressures, and then mixing said noncohering resin coated particles with a resin plasticizer until the outer surfaces only of said resin films are changed from a relatively noncohering state to a cohering state and without disturbing the bond between the resin coating and said particles.

2. The process of conditioning siliceous particles selected from the group consisting of silicon dioxide and silicon carbide for use in making molds and cores for casting molten metal which comprises: mixing the siliceous particles with a surface wetting hydrocarbon liquid solution of plasticizable nonthermosetting resin until said particles are thoroughly wetted by said solution, evaporating the solvent from said mixture to fix coatings of the resin on said siliceous particles while continuing the mixing agitation and preventing cohesion of particles until each particle acquires a relatively solid adherent film of said resin that is substantially noncohering under normal temperatures and pressures, and then mixing said noncohering resin coated particles with resin plasticizer including thermosetting resin until the outer surfaces only of said resin films are changed from their relatively noncohering state to a cohering state and without disturbing the bond between the resin coating and said particles.

3. The process of conditioning siliceous particles selected from the group consisting of silicon dioxide and silicon carbide for use in making molds and cores for casting molten metal which comprises: mixing the siliceous particles with a surface wetting hydrocarbon liquid solution of plasticizable nonthermosetting resin until said particles are thoroughly wetted by said solution, evaporating the solvent from said mixture to fix coatings of the resin on said siliceous particles while continuing the mixing agitation and preventing cohesion of particles until each particle acquires a relatively solid adherent film of said resin that is substantially noncohering under normal temperatures and pressures, and then mixing said noncohering resin coated particles with resin plasticizer including a drying oil until the outer surfaces only of said resin films are changed from a relatively noncohering state to a cohering state and without disturbing the bond between the resin coating and said particles.

4. The process of conditioning siliceous particles selected from the group consisting of silicon dioxide and silicon carbide for use in making molds and cores for casting molten metal which comprises: mixing the siliceous particles with a surface wetting hydrocarbon liquid solution of plasticizable nonthermosetting resin containing metallic oxides until said particles are thoroughly wetted by said solution, evaporating the solvent from said mixture to fix coatings of the resin on said siliceous particles while continuing the mixing agitation and preventing cohesion of particles until each particle acquires a relatively solid adherent film of said resin including metallic oxide that is substantially noncohering under normal temperature and pressures, and then mixing said noncohering resin coated particles with a resin plasticizer until the outer surfaces only of said resin films are changed from a relatively noncohering state to a cohering state and without disturbing the bond between the resin coating and said particles.

5. The process of conditioning siliceous particles selected from the group consisting of silicon dioxide and silicon carbide for use in making molds and cores for casting molten metal which comprises: mixing the siliceous particles with a surface wetting hydrocarbon liquid solution of plasticizable, nonthermosetting resin, including metallic oxides and drying oil, until said particles are thoroughly wetted by said solution, evaporating the solvent from said mixture to fix coatings of the resin on said siliceous particles while continuing the mixing agitation and preventing cohesion of particles until each particle acquires a relatively solid adherent film of said resin including metallic oxide that is substantially noncohering under normal temperatures and pressures, and then mixing said noncohering resin coated particles with a resin plasticizer until the outer surfaces only of said resin films are changed from a relatively noncohering state to a cohering state.

6. The process of conditioning siliceous particles selected from the group consisting of silicon dioxide and silicon carbide for use in making molds and cores for casting molten metal comprising: first mixing the siliceous particles with a surface-wetting hydrocarbon liquid solution of plasticizable nonthermosetting resin until said particles are thoroughly wetted by said solution; evaporating the hydrocarbon liquid from the solution and drying the mixture to fix a resin coating on each of said particles; agitating said mixture during the evaporating and drying steps to prevent cohesion of the particles, said agitation being continued without interruption until each particle acquires a relatively solid adherent coating which is substantially noncohering under normal temperature and pressure; and then mixing said noncohering resin-coated particles with a resin plasticizer until the outer surfaces only of said resin coatings are changed from a relatively noncohering state to a cohering state whereby to develop cohesiveness between the surfaces of the coatings without appreciably affecting or disturbing the adhesive bonds between such coating and said particles to get the mix into condition for making molds or cores.

7. The process of conditioning siliceous particles selected from the group consisting of silicon dioxide and silicon carbide for use in making molds and cores for casting molten metal comprising: first mixing the siliceous particles with a surface-wetting hydrocarbon liquid solution of plasticizable nonthermosetting resin until said particles are thoroughly wetted by said solution; evaporating the hydrocarbon liquid from the solution and drying the mixture to fix a resin coating on each of said particles; agitating said mixture during the evaporating and drying steps to prevent cohesion of the particles, said agitation being continued without interruption until each particle acquires a relatively solid adherent coating which is substantially noncohering under normal temperature and pressure, then mixing said noncohering resin-coated particles with a resin plasticizer until the outer surfaces only of said resin coatings are changed from a relatively noncohering state to a cohering state whereby to develop cohesiveness between the surfaces of the coatings without appreciably affecting or disturbing the adhesive bonds between such coatings and said particles to get the mix into condition for making molds or cores, and then forming the cohesive mass of resin-coated particles against a suitable shape corresponding to a pattern or corebox.

BONHEUR M. WESTON.

REFERENCES CITED

The following references are of record in the file of this patent:

UNITED STATES PATENTS

| Number | Name | Date |
|---|---|---|
| 1,723,982 | Pate | Aug. 6, 1929 |
| 1,770,686 | DeWitt | July 15, 1930 |
| 1,778,329 | Mason | Oct. 14, 1930 |
| 1,975,339 | Malaspina | Oct. 2, 1934 |
| 2,047,297 | Stahl | July 14, 1936 |
| 2,201,321 | Robie | May 21, 1940 |
| 2,203,471 | Ray | June 4, 1940 |
| 2,274,618 | Remig | Feb. 24, 1942 |
| 2,328,622 | Crawford | Sept. 7, 1943 |
| 2,387,827 | Borglin | Oct. 30, 1945 |
| 2,409,437 | LaCross | Oct. 15, 1946 |